United States Patent
Heijkenskjöld

(10) Patent No.: US 6,341,547 B2
(45) Date of Patent: Jan. 29, 2002

(54) LATHE AND METHOD FOR TURNING A WORK PIECE ON A LATHE

(75) Inventor: Mats Heijkenskjöld, Lidköping (SE)

(73) Assignee: Lidkoping Machines Tools AB, Lidkoping (SE)

( * ) Notice: Subject to any disclaimer, the term of this patent is extended or adjusted under 35 U.S.C. 154(b) by 0 days.

(21) Appl. No.: 09/754,072

(22) Filed: Jan. 5, 2001

Related U.S. Application Data

(63) Continuation of application No. PCT/SE99/01087, filed on Jun. 17, 1999.

(30) Foreign Application Priority Data

Jul. 10, 1998 (SE) .................................... 9802504

(51) Int. Cl.$^7$ .............................. B23B 1/00; B23B 5/16
(52) U.S. Cl. .............................. 82/1.11; 82/1.2; 82/1.4; 82/123
(58) Field of Search ................. 82/1.11, 118, 130, 82/129, 131, 123, 157, 124, 147, 1.2, 1.3, 1.4

(56) References Cited

U.S. PATENT DOCUMENTS

| | | | |
|---|---|---|---|
| 3,277,752 A | * 10/1966 | Lindemann | 82/130 |
| 4,058,033 A | * 11/1977 | Lahm et al. | 82/130 X |
| 4,624,159 A | * 11/1986 | Kumer et al. | 82/19 |
| 4,626,149 A | * 12/1986 | Holy et al. | 409/191 |
| 4,805,431 A | * 2/1989 | Azarevich et al. | 72/70 |
| 5,303,621 A | * 4/1994 | Horlitz et al. | 82/1.11 |
| 6,158,311 A | * 12/2000 | Watkins et al. | 82/1.4 |

FOREIGN PATENT DOCUMENTS

| | | |
|---|---|---|
| CH | 260918 | 8/1949 |
| DE | 26 42 965 | 3/1978 |
| EP | 0 278 898 | 8/1988 |

* cited by examiner

*Primary Examiner*—Henry Tsai
(74) *Attorney, Agent, or Firm*—Burns, Doane, Swecker & Mathis, L.L.P.

(57) ABSTRACT

A lathe includes a frame for supporting rotatable chucking equipment adapted to hold a work piece. The frame further supports at least one lathe tool for machining the work piece. The chucking equipment and the lathe tool are displaceable relative to each other in at least a radial direction. The lathe includes a housing attached to the frame, with the housing extending about a longitudinal axis and having a cylindrical inner space extending from one end of the housing. The inner space has a longitudinal axis parallel to, though offset from, the longitudinal axis of the housing. An angularly displaceable shaft is arranged in the inner space and carries the chucking equipment. A rotatable outer casing peripherally encloses the cylindrical elongate housing. The rotatable outer casing carries the lathe tool. Rotation of the rotatable outer casing causes the lathe tool to effect a radial displacement relative to the chucking equipment.

17 Claims, 3 Drawing Sheets

LATHE AND METHOD FOR TURNING A WORK PIECE ON A LATHE

This application is a continuation of International Application No. PCT/SE99/01087, filed on Jun. 17, 1999, which designates the United States.

TECHNICAL FIELD

The present invention relates to a lathe according to the preamble of claim 1 and to a method for turning a work piece on a lathe.

BACKGROUND OF THE INVENTION

A traditional lathe generally comprises a bed carrying a head-stock and a tall-stock between which a work piece is supported. The work piece is held in chucking equipment attached to the headstock and is rotated by a motor driving the chucking equipment. Such a lathe further comprises a carriage arranged for displacement along the bed and carrying a slide rest by which a machine tool is held and traversed. To obtain high precision and accuracy during machining, the constituent components of the lathe must be rigid and stable. This generally implies that the lathe is bulky and heavy.

Lathes are also known in which the work piece is stationary and the machine tool is rotated about the work piece. Examples of such lathes are described in EP-B-0 278 898, DE-A-26 42 965 and CH-260918. Common to each of these lathes is the need for a relatively complex system for obtaining radial displacement of the machine tool relative the work piece.

SUMMARY OF THE INVENTION

It is therefore an object of the present invention to provide a lathe which offers high machining precision, though which is less complex and less bulky than traditional lathes.

This object is achieved by means of the lathe according to claim 1.

It is a further object of the invention to provide a method for turning a work piece on a lathe, which method implies high machining precision, but which can be executed on a relatively simple lathe.

This object is achieved by the method according to claim 13.

Preferred embodiments of the lathe and the method according to the present invention are detailed in the respective dependent claims.

BRIEF DESCRIPTION OF THE DRAWINGS

The invention will be described in greater detail in the following by way of example only and with reference to embodiments shown in the attached drawings, in which.

DETAILED DESCRIPTION OF PREFERRED EMBODIMENTS

Figure 1:
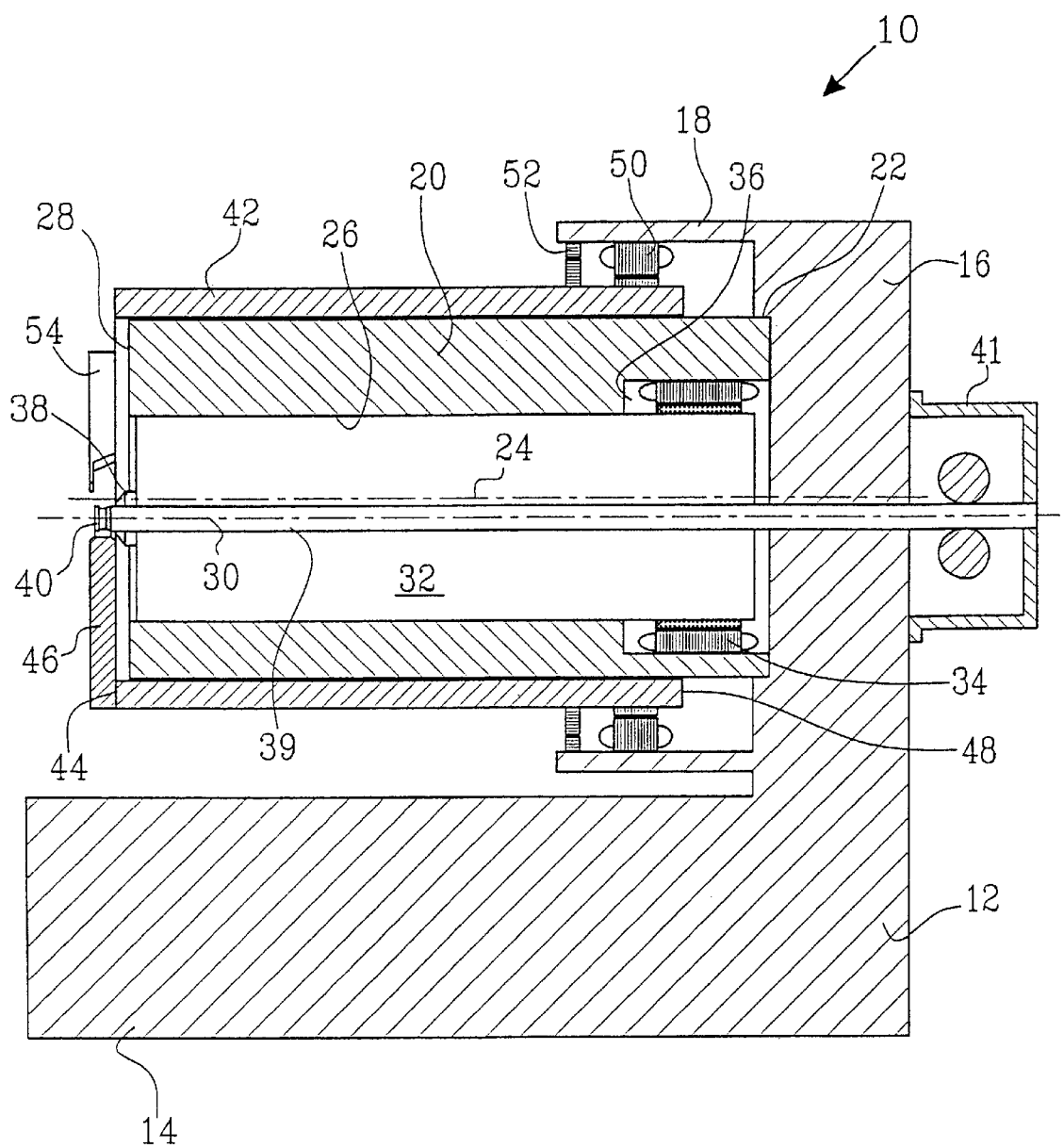
FIG. 1 shows in a schematic longitudinal sectional view of a first embodiment of a lathe according to the invention.

In the drawings, reference numeral 10 generally denotes a lathe according to the present invention. The lathe 10 incorporates a frame 12 having a base section 14 and a support section 16 extending generally perpendicular to the base section 14. The support section 16 presents an annular housing 18 in which a stationary cylindrical elongate housing 20 is centrally located by means of being rigidly affixed in a recess 22 in the frame 12.

The cylindrical elongate housing 20 extends about a first longitudinal axis 24. The cylindrical elongate housing 20 is provided with a longitudinal cylindrical inner space 26 extending from a first end 28 of the housing 20, the first end of the housing being that end of the housing remote from the support section 16 of the frame 12. The cylindrical inner space 26 extends along a second longitudinal axis 30 which is parallel to, though offset from, the first longitudinal axis 24 of the cylindrical elongate housing 20. In the drawings, the cylindrical inner space 26 extends the entire length of the elongate housing 20, though it will be apparent from the following description that the invention can also be practised using an elongate housing having an offset cylindrical inner space which extends only part through the housing from the first end.

The cylindrical inner space 26 is adapted to support a shaft 32 such that the shaft 32 may execute angular displacement within the inner space. To attain angular displacement, the lathe 10 comprises first displacement means 34, preferably in the form of an electric torque motor, which advantageously can be accommodated within an internal recess 36 in the elongate housing 20. Thus, the stator of the motor can be carried by the elongate housing while the rotor is carried by the shaft 32. The internal recess 36 is preferably formed by providing a bore of greater diameter than the cylindrical space 26 in the end of the elongate housing remote from the first end 28.

At its end adjacent the first end 28 of the elongate housing 20, the shaft 32 carries chucking equipment 38 centered about the longitudinal axis 30 of the inner space 26 and thereby the shaft 32. The chucking equipment 38 is adapted to hold a work piece 40 which is to be machined. The chucking equipment 38 may be of any conventional type which is suitable for clamping the work piece, such as centric chucking, micro-centric chucking or magnetic chucking. In the drawings, the shaft 32 has been illustrated having a longitudinally extending bore 39 extending the entire length of the shaft. Such an embodiment is useful when the work piece is in the form of a rod of material or the like. Naturally, if work pieces of relatively short length are to be machined, the invention may also be practised using a solid shaft to carry the chucking equipment 38 or a shaft having a longitudinally extending bore which extends only part way along the shaft.

In applications in which the work piece constitutes an end portion of a rod of material, the lathe 10 may be provided with material feeding means 41 cooperating with the rod of material to thereby advance the rod when machining of one work piece has terminated and machining of a subsequent work piece is to commence. The material feeding means 41 may be any known means which is suitable for indexing and/or advancing the rod of material a predetermined distance.

Figure 2:
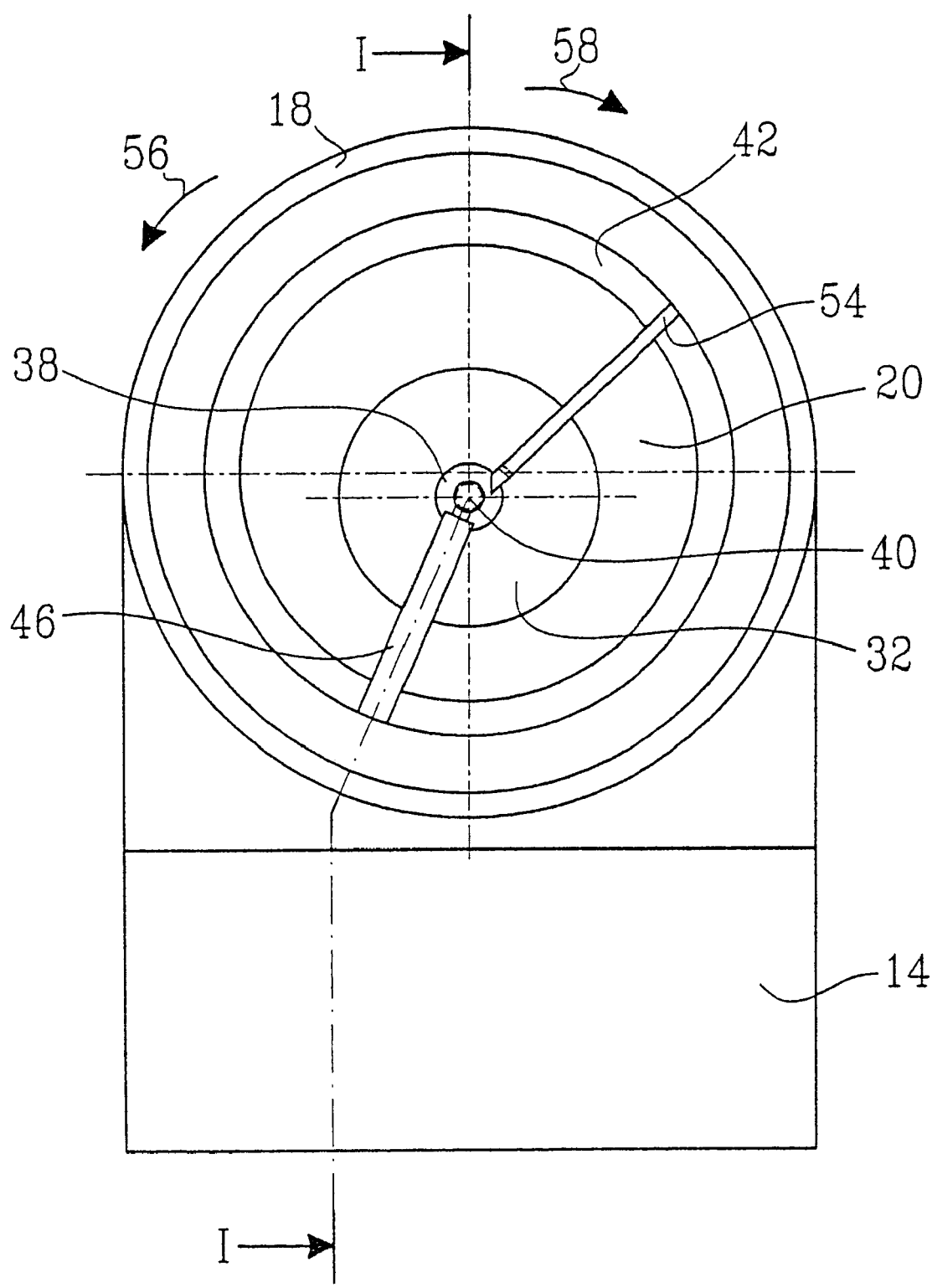
FIG. 2 is a schematic end view of the lathe shown in FIG. 1.

The lathe 10 further comprises a rotatable outer casing 42 which peripherally encloses the cylindrical elongate housing 20 along at least a length of the housing extending from the first end 28 of the housing. The rotatable outer casing 42 is preferably in the form of a cylindrical sleeve which is concentric with the cylindrical elongate housing 20. A first end 44 of the outer casing 42, corresponding to the end of the outer casing adjacent the first end 28 of the elongate housing 20, is adapted to carry at least one lathe tool 46. Advantageously, the outer casing 42 extends along the elongate housing 20 a distance such that a second end 48 of the casing terminates within the annular housing 18 of the frame 12. In this manner, the frame 12 can support second displacement means 50, preferably an electric torque motor, which acts on the rotatable outer casing 42 to effect rotation thereof, with the second displacement means being accommodated within the annular housing 18. To detect and control the rotation of the outer casing 42, first sensor means 52 may also be supported by the frame 12 within the annular housing As is most clearly apparent from FIG. 2, the illustrated embodiment of the lathe 10 is provided with a first lathe tool 46 and a parting tool 54. In the illustrated embodiment, the first lathe tool is a profiling tool which is intended to be displaced radially with respect to the work piece 40 to thereby impart a shape to the mantel surface of the work piece corresponding to the profile of the tool 46. In accordance with the present invention, the radial displacement of the profiling tool is attained by rotation of the rotatable outer casing 42 about the cylindrical elongate housing 20. Thus, due to the fact that the work piece 40 is constrained to rotate about the second longitudinal axis 30 and the machine tool has a centre of rotation lying on the first longitudinal axis 24, rotation of the outer casing 42 in one direction will cause the lathe tool to approach the work piece, whilst rotation of the outer casing in the opposite direction will cause the lathe tool to move away from the work piece. In FIG. 2, arrow 56 indicates the direction of rotation to cause the lathe tool 46 to approach the work piece and arrow 58 indicates the direction of rotation to cause the lathe tool 46 to move away from the work piece.

From FIG. 2, it will be apparent that the profiling tool 46 and the parting tool 54 are circumferentially spaced by an angle such that as the profiling tool 46 approaches the work piece 40, the parting tool 54 is moved away from the work piece. Conversely, as the profiling tool moves away from the work piece, the parting tool approaches the work piece.

The lathe of FIGS. 1 and 2 may be operated in the following manner.

The work piece 40 is clamped in the chucking equipment 38 with the outer casing 42 in an angular position such that neither the profiling tool 46 nor the parting tool 54 interfere with the work piece. The first displacement means 34 is thereafter activated to rotate the shaft 32 and thereby the work piece 40. The second displacement means 50 is then activated to cause the outer casing 42 to rotate in the direction of arrow 56 in FIG. 2 to cause the profiling tool 46 to come into contact with the work piece 40. The outer casing continues to be rotated in the direction of arrow 56 until a desired depth of machining of the mantel surface of the work piece has been attained.

When machining of the work piece by the profiling tool 46 has been completed, the outer casing 42 is rotated in the direction of arrow 58 until the profiling tool 46 is clear of the work piece. The rod of material is then displaced axially to the left in FIG. 1 by the material feeding means 41. This presupposes that the chucking equipment 38 at least temporarily releases its grip on the work piece. This can be achieved by not shown control means coordinating the release of the chucking equipment 38 and the operation of the material feeding means 41. The rod of material is displaced a distance corresponding to the desired length of the work piece which has just been machined. Thereafter, the chucking equipment re-grips the rod of material and the outer casing 42 is rotated in the direction of arrow 58 to thereby brine the parting tool 54 into contact with the rod of material. Continued rotation of the outer casing in the same direction causes the parting tool to sever the machined work piece from the remainder of the rod of material. Machining of a new work piece at the newly exposed end of the rod of material is effected by rotating the outer casing 42 in the direction of arrow 56. Thereafter, the previously described cycle is repeated.

Figure 3:
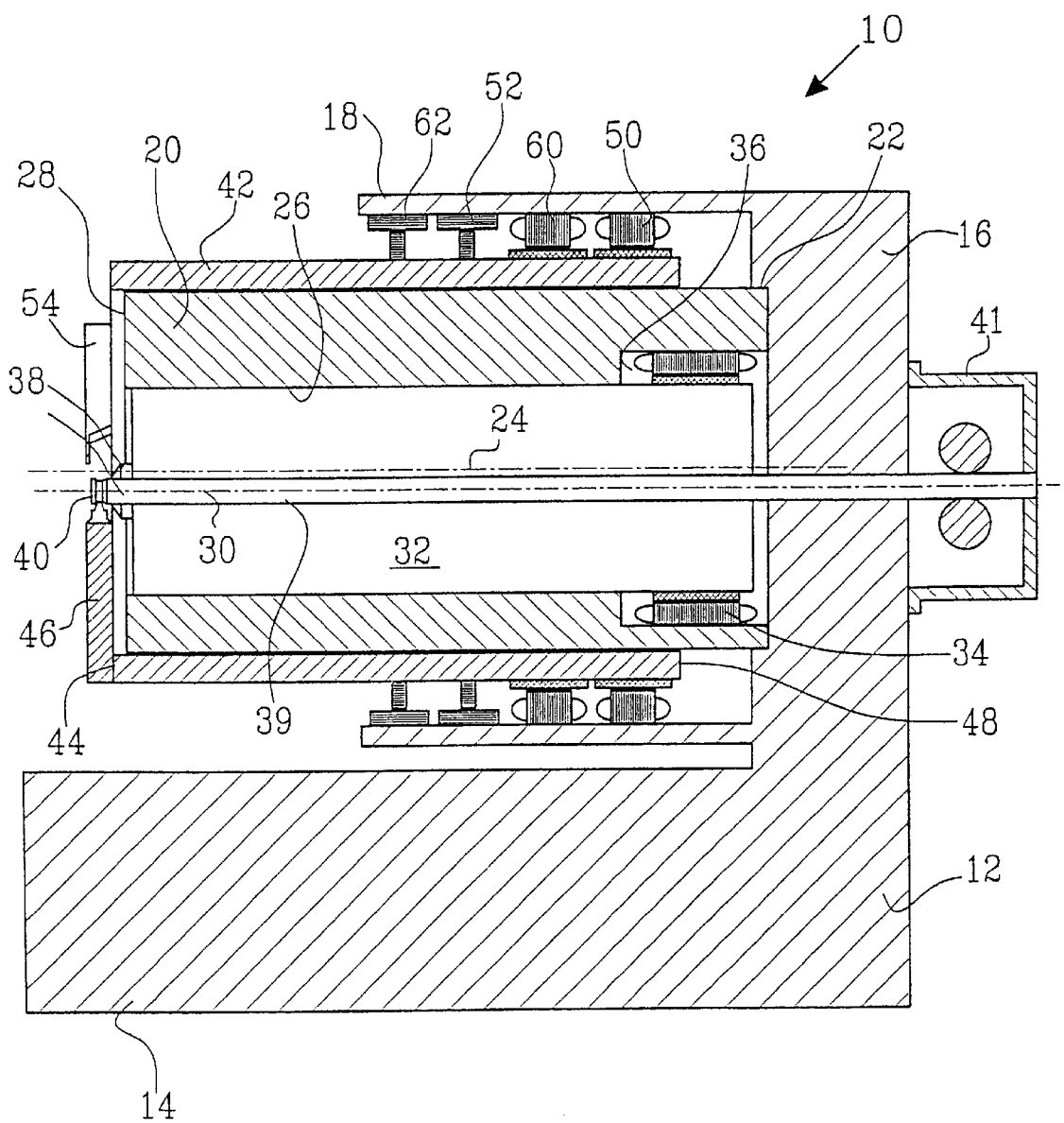
FIG. 3 is a schematic longitudinal sectional view of a second embodiment of a lathe according to the invention.

The embodiment of the lathe shown in FIG. 3 is similar to that described above. Thus, the same reference numerals have been used for corresponding parts. The primary difference between the lathes is that the lathe of FIG. 3 is provided with third displacement means 60 supported by the frame and preferably being accommodated within the annular housing 18. The third displacement means 60 is preferably a linear electric motor acting on the rotatable outer casing 42 to effect axial displacement thereof along the tubular cylindrical housing 20. To detect and control the axial displacement of the outer casing 42, second sensor means 62 may also be supported by the frame 12 within the annular housing 18.

The embodiment of the invention shown in FIG. 3 is useful for producing work pieces which require machining over a relatively large surface. Thus, the lathe tool can be a turning tool 64 such as a round-nosed tool which can be displaced over a length of the work piece by means of the third displacement means 60. The depth of cut can of course be controlled by rotation of the outer casing 42 in a manner described earlier. The method of operation of the lathe of the FIG. 3 embodiment is essentially identical to that already described, though of course with the added degree of freedom obtained by the axial displacement of the outer casing 42. This implies that the positioning of the line of severing of the workpiece from the rod of material can be determined either by operation of the material feeding means 41 or by axial displacement of the parting tool 54 carried by the outer casino 42.

The invention is not limited to the embodiments described above and shown in the drawings. Instead, all modifications and variations within the scope of the appended claims are to be deemed to be covered. For example, the action of the material feeding means 41 may instead be achieved manually. It is also conceivable that the material feeding means 41 be replaced by a puller at the chucking equipment end of the lathe.

What is claimed is:

1. A lathe comprising a frame for supporting rotatable chucking equipment that is adapted to hold a work piece, said frame further supporting at least one lathe tool for machining said work piece, said chucking equipment and said lathe tool being displaceable relative each other in at least a radial direction, a cylindrical elongate housing rigidly attached to said frame, said housing extending about a longitudinal axis and having a longitudinal cylindrical inner space extending from a first end of said housing, said cylindrical inner space having a longitudinal axis which is parallel to, though offset from, the longitudinal axis of said housing;

a shaft arranged in said inner space for angular displacement therein, said shaft carrying said chucking equipment; and a rotatable outer casing peripherally enclosing said cylindrical elongate housing, said rotatable outer casing carrying said at least one lathe tool, wherein rotation of said rotatable outer casing causes said at least one lathe tool to effect a radial displacement relative to said chucking equipment.

2. The lathe as claimed in claim 1, wherein said rotatable outer casing is concentric with said cylindrical elongate housing.

3. The lathe as claimed in claim 1, wherein said cylindrical elongate housing accommodates first displacement means for effecting said angular displacement of said shaft.

4. The lathe as claimed in claim 3, wherein said first displacement means comprises an electric motor housed in an internal recess in said cylindrical elongate housing.

5. The lathe as claimed in claim 1, wherein said frame supports second displacement means acting on said rotatable outer casing to effect said rotation thereof.

6. The lathe as claimed in claim 5, wherein said frame supports first sensor means for detecting and controlling said rotation of said rotatable outer casing.

7. The lathe as claimed in claim 1, wherein said frame supports third displacement means preferably a linear electric motor, said third displacement means acting on said rotatable outer casing to effect axial displacement thereof along said cylindrical elongate housing.

8. The lathe as claimed in claim 7, wherein said frame supports second sensor means for detecting and controlling said axial displacement of said rotatable outer casing.

9. The lathe as claimed in claim 1, wherein said shaft has a central bore adapted to accommodate at least a portion of said work piece.

10. The lathe as claimed in claim 9, wherein said central bore extends the entire length of said shaft.

11. The lathe as claimed in claim 1, wherein the lathe further comprises material feeding means for displacing said work piece relative to said chucking means.

12. The lathe as claimed in claim 1, wherein said rotatable outer casing further carries a parting tool for severing a length of said work piece.

13. A method for turning a work piece on a lathe, said lathe comprising:

a frame for supporting rotatable chucking equipment, said chucking equipment being adapted to hold a work piece;

a cylindrical elongate housing rigidly attached to said frame, said housing extending about a longitudinal axis and having a longitudinal cylindrical inner space extending from a first end of said housing, said cylindrical inner space having a longitudinal axis which is parallel to, though offset from, the longitudinal axis of said housing;

a shaft arranged in said inner space for angular displacement therein, said shaft carrying said chucking equipment; and a rotatable outer casing peripherally enclosing said cylindrical elongate housing, said rotatable outer casing carrying at least one lathe tool, said method comprising:
clamping said work piece in said chucking equipment;
rotating said shaft to thereby rotate said work piece, and
rotating said outer casing to effect radial displacement of said at least one lathe tool relative to said work piece.

14. The method as claimed in claim 13, comprising displacing said outer casing axially to effect an axial displacement of said at least one lathe tool relative to said work piece.

15. The lathe as claimed in claim 4, wherein the electric motor comprising the first displacement means is a torque motor.

16. The lathe as claimed in claim 5, wherein the second displacement means is an electric torque motor.

17. The lathe as claimed in claim 7, wherein the third displacement means is a linear electric motor.

* * * * *